(12) United States Patent
Crepaldi et al.

(10) Patent No.: US 9,150,105 B2
(45) Date of Patent: Oct. 6, 2015

(54) VEHICLE DASHBOARD PROVIDED WITH A HOUSING FOR SUPPORTING A PORTABLE ELECTRONIC DEVICE

(71) Applicants: Davide Crepaldi, Turin (IT); Marco Angeletti, Turin (IT); Andrea Mainini, Turin (IT); Carlo Lorenzano, Turin (IT)

(72) Inventors: Davide Crepaldi, Turin (IT); Marco Angeletti, Turin (IT); Andrea Mainini, Turin (IT); Carlo Lorenzano, Turin (IT)

(73) Assignee: Fiat Group Automobiles S.p.A., Turin (IT)

(*) Notice: Subject to any disclaimer, the term of this patent is extended or adjusted under 35 U.S.C. 154(b) by 0 days.

(21) Appl. No.: 14/297,797

(22) Filed: Jun. 6, 2014

(65) Prior Publication Data

US 2014/0361569 A1 Dec. 11, 2014

(30) Foreign Application Priority Data

Jun. 6, 2013 (IT) .............................. TO2013A0470

(51) Int. Cl.
| | |
|---|---|
| *B60R 11/02* | (2006.01) |
| *B60K 35/00* | (2006.01) |
| *B60K 37/04* | (2006.01) |
| *B60K 37/06* | (2006.01) |
| *B60R 11/00* | (2006.01) |

(52) U.S. Cl.
CPC ................ *B60K 35/00* (2013.01); *B60K 37/04* (2013.01); *B60K 37/06* (2013.01); *B60R 11/0235* (2013.01); *B60R 11/0241* (2013.01); *B60R 11/0252* (2013.01); *B60K 2350/355* (2013.01); *B60K 2350/357* (2013.01); *B60R 2011/0005* (2013.01); *B60R 2011/0075* (2013.01)

(58) Field of Classification Search
CPC B60R 11/02; B60R 11/0241; B60R 11/0229; B60R 11/0235; B60R 11/0258; B60R 2011/0085; B60R 2011/0075; B60R 2011/007; B60R 2011/0042; B60R 2011/0043; B60R 2011/0045; B60R 2011/0047; B60R 2011/0282; B60R 2011/0288; B60R 2011/0294; B60R 7/06
USPC .......................... 296/70, 37.8, 37.12; 180/90; 248/917–924
See application file for complete search history.

(56) References Cited

U.S. PATENT DOCUMENTS

| | | | | |
|---|---|---|---|---|
| 7,469,951 | B2* | 12/2008 | Welschholz et al. | 296/37.8 |
| 7,900,988 | B2* | 3/2011 | Ryu | 296/37.12 |
| 8,002,179 | B2* | 8/2011 | Feit et al. | 235/382 |
| 8,544,927 | B2* | 10/2013 | Clochard | 296/37.12 |

(Continued)

FOREIGN PATENT DOCUMENTS

| | | |
|---|---|---|
| DE | 10 2005 021 105 A1 | 11/2006 |
| DE | 10 2008 014 142 A1 | 9/2009 |

(Continued)

OTHER PUBLICATIONS

English translation of DE 10 2008 014 142 A1 performed by machine on Jan. 13, 2015.*

*Primary Examiner* — Gregory Blankenship
(74) *Attorney, Agent, or Firm* — Dickstein Shapiro LLP

(57) ABSTRACT

A vehicle dashboard has a fixed structure and a casing defining a pocket having a substantially rectangular perimeter, which is defined by an upper edge, a lower edge and two side edges so as to house a portable electronic device having a screen which remains visible through a window defined by a front frame of the casing; at one of the aforesaid edges, the casing has an opening which is used to insert/remove the portable electronic device along a sliding direction and is closed by a closing element.

8 Claims, 4 Drawing Sheets

(56) References Cited

U.S. PATENT DOCUMENTS

| | | | |
|---|---|---|---|
| 8,550,529 B2* | 10/2013 | Clochard | 296/37.12 |
| 8,641,121 B2* | 2/2014 | Schipper et al. | 296/37.12 |
| 8,646,824 B2* | 2/2014 | Da Costa Pito et al. | 296/37.12 |
| 8,807,621 B2* | 8/2014 | Stephan | 296/37.12 |
| 8,870,137 B2* | 10/2014 | Jacobson | 248/222.51 |
| 8,904,308 B2* | 12/2014 | Kramer et al. | 715/810 |
| 8,910,990 B1* | 12/2014 | Oldani et al. | 296/37.8 |
| 2010/0161220 A1* | 6/2010 | Masuda et al. | 701/208 |
| 2013/0259261 A1* | 10/2013 | Mitchell | 381/86 |
| 2014/0327836 A1* | 11/2014 | Vitito | 348/837 |
| 2014/0339847 A1* | 11/2014 | Brunard et al. | 296/37.12 |
| 2014/0354002 A1* | 12/2014 | Bisceglia et al. | 296/37.12 |
| 2014/0361569 A1* | 12/2014 | Crepaldi et al. | 296/37.12 |

FOREIGN PATENT DOCUMENTS

| | | |
|---|---|---|
| EP | 2 000 364 A1 | 12/2008 |
| FR | 2 947 225 A1 | 12/2010 |
| GB | 2486569 A | 6/2012 |

* cited by examiner

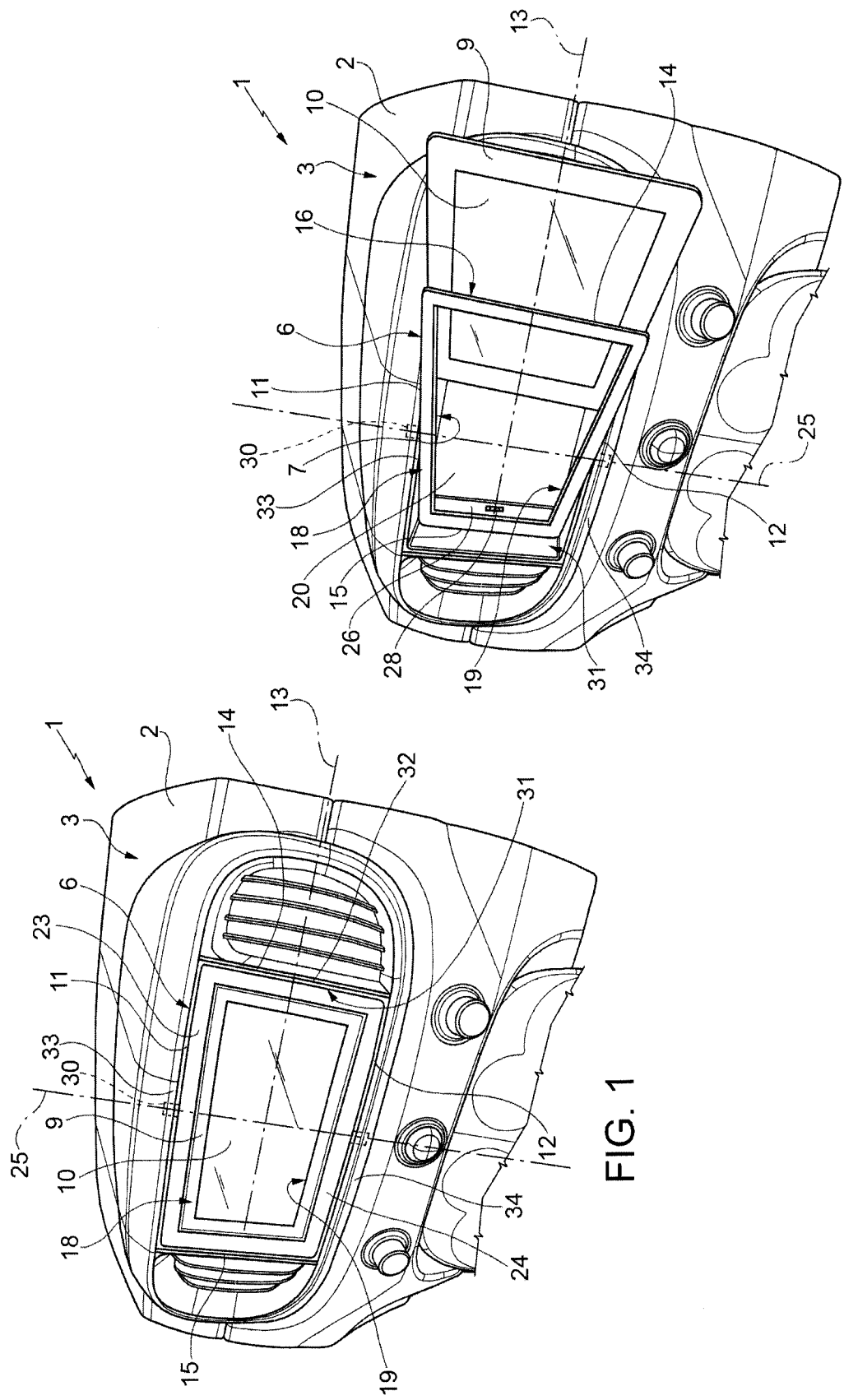

VEHICLE DASHBOARD PROVIDED WITH A HOUSING FOR SUPPORTING A PORTABLE ELECTRONIC DEVICE

The present invention relates to a vehicle dashboard provided with a housing for supporting a portable electronic device, in particular a portable electronic device with a touchscreen.

Portable electronic devices, such as satellite navigators, tablets and mobile phones, are very widespread and are also used on vehicles.

BACKGROUND OF THE INVENTION

Generally, portable electronic devices have a touchscreen and are coupled to a support which, in turn, is attached to the windscreen of the vehicle by means of a suction cap in such a position to be able to easily touch the screen and thus control the various functions. However, this type of suction cap coupling is subject to undesired releases and may compromise external visibility through the windscreen.

It is thus felt the need to integrate the portable electronic device directly in the dashboard of the vehicle, to make it comfortable and simple to use and to guarantee a stable coupling but without excessively compromising the appearance and the structural features of the dashboard.

SUMMARY OF THE INVENTION

It is the object of the present invention a vehicle dashboard provided with a housing for supporting a portable electronic device, which allows to solve the needs illustrated above in simple and cost-effective manner.

According to the present invention a vehicle dashboard with a housing for supporting a portable electronic device is provided as disclosed in claim 1.

BRIEF DESCRIPTION OF THE DRAWINGS

The invention will now be described with reference to the appended drawings which illustrate a non-limitative embodiment thereof, in which:

FIGS. 1 and 2 show a perspective view of a preferred embodiment of a vehicle dashboard provided with a housing for supporting a portable electronic device, according to the present invention;

DETAILED DESCRIPTION OF THE INVENTION

Figure 3:
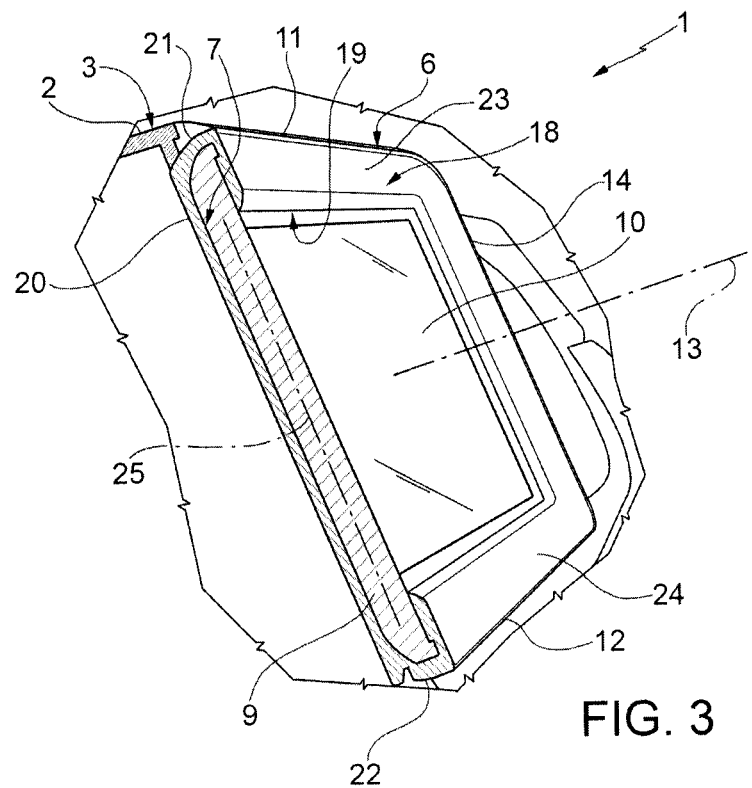
FIG. 3 shows the dashboard in FIG. 1 in perspective view and in section taken along a vertical section plane.

In FIGS. 1 and 2, reference numeral 1 indicates, as a whole, a vehicle dashboard (partially shown) comprising a structure 2 made of plastic material and having a surface 3 facing the passenger compartment.

The dashboard 1 further comprises a housing or casing 6, which defines a pocket 7 (FIG. 2) having shape and size such to house a portable electronic device 9 in fixed position. In particular, the device 9 has a touchscreen 10. In the accompanying figures, the device 9 is a tablet. However, the casing 6 configured so as to house a mobile phone, a satellite navigator or any other type of portable electronic device.

The pocket 7 has a substantially rectangular perimeter, consisting of a upper edge 11 and a lower edge 12, which are substantially parallel to a horizontal axis 13; and by two side edges 14 and 15, which are opposite to each other along the axis 13.

The casing 6 has an opening 16 for inserting/extracting the device 9 at one of the edges 11, 12, 14 and 15. In particular, as shown in FIG. 2, the opening 16 is made at the side edge 14. At the same time, the size of the pocket 7 is established so as to be substantially equal to that of the device 9, and therefore the casing 6 itself defines a guide for guiding the device 9 along the axis 13 during the insertion/extraction through the opening 16.

The casing 6 comprises a frame 18, which frontally delimits the pocket 7, lays on a plane substantially parallel to the axis 13 and defines a window 19, which is open so as to directly display the screen 10 of the device 9 and directly control the device 9 by touching the screen 10. In this embodiment, the frame 18 extends along all four sides of the window 19.

According to an alternative (not shown), the window 19 is closed by a transparent film, having position and features so as to adhere on the screen 10 when the device 9 is housed in the pocket 7 in order to be able to control the device 9 in reliable manner. Such a film could either be stably coupled to the casing 6 or be of the removable and/or replaceable type.

With reference to FIGS. 2 and 3, the casing 6 comprises a bottom wall 20 which faces the frame 18 and the window 19, delimits the back of the pocket 7 and is preferably free from openings. In particular, the bottom wall 20 is set apart from the frame 18 by an amount substantially equal to the thickness of the device 9.

Again with reference to FIG. 3, the casing 6 comprises respective walls 21 and 22 at the upper edge 11 and at the lower edge 12, which delimit the pocket 7 on the top and on the bottom, join the bottom wall 20 to an upper portion 23 and to a lower portion 24 of the frame 18, respectively, face each other along a substantially vertical axis 25 orthogonal to the axis 13, and are transverse to the axis 25.

In particular, the walls 21 and 22 are set apart by an amount substantially equal to the width of the device 9.

Figure 4:
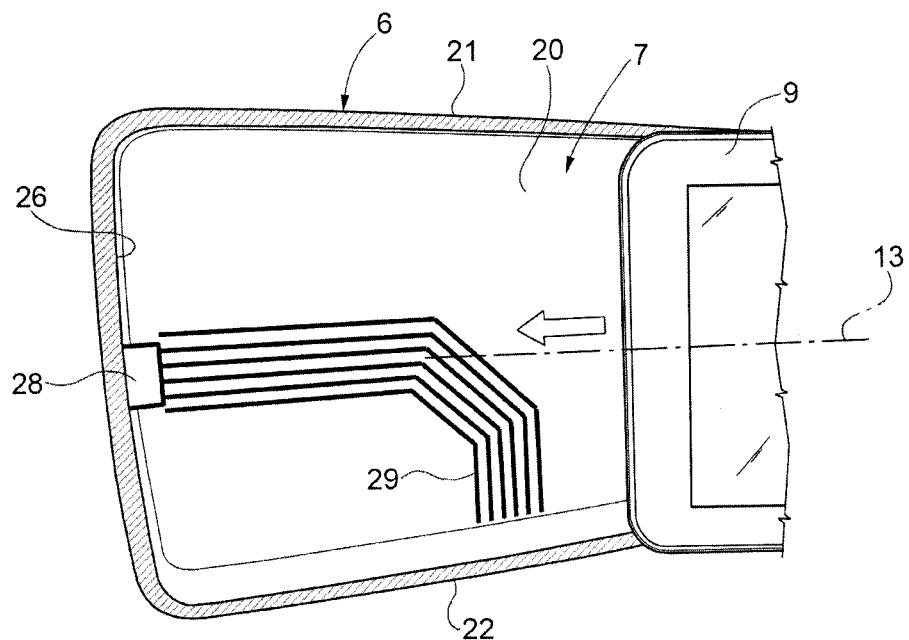
FIG. 4 shows a perspective view with parts removed for clarity of detail of the housing of the dashboard in FIG. 1.

With reference to FIGS. 2 and 4, at the lateral edge 15, the casing 6 comprises a wall 26, which is substantially orthogonal to the axis 13 and defines an abutment for inserting the device 9 in the pocket 7. Again at the side edge 15, the casing 6 supports a connector 28 arranged in the pocket 7 and connected to the electric and electronic network of the vehicle, for example by means of a circuit 29 arranged on the bottom wall 20. The connector 28 is adapted to couple to a corresponding connector of the device 9, automatically at the end of the insertion stroke of the device 9, because the connector 28 is aligned with the connector of the device 9.

Again with reference to FIGS. 1 and 2, the casing 6 is coupled to the structure 2 by means of a connection device 30 (diagrammatically shown) which allows the casing 6 to move between an operative position (FIG. 1) and an opening position (FIG. 2). In the operative position, the casing 6 is housed in a cavity 31 of the structure 2, and therefore the opening 16 remains closed by a fixed wall 32, which belongs to the structure 2 and laterally delimits the cavity 31. Preferably, the frame 18 remains flush with the surface 3.

In the opening position, instead, an end of the casing 6 projects outside the cavity 31, towards the passenger compartment, so as to make the opening 16 accessible for either inserting or extracting the device 9.

Preferably, the device 30 is defined by a hinge which connects the casing 6 to an upper horizontal wall 33 and a lower horizontal wall 34 of the cavity 31 and allows the casing 6 to rotate with respect to the structure 2 about the axis 25.

According to an alternative (not shown), the device 30 defines a guide coupling for making the casing 6 slide along an axis orthogonal to the axes 13 and 25 (i.e. orthogonal to the window 19 and to the bottom wall 20).

Figure 6:
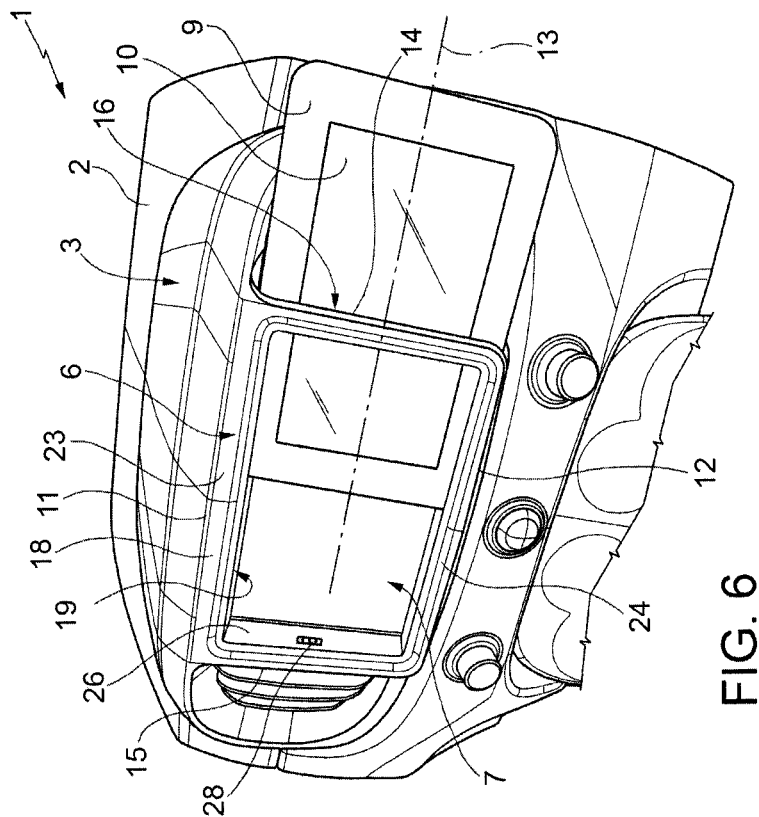
FIGS. 5 and 6 are similar to FIGS. 1 and 2, respectively, and show a first variant of the dashboard of the present invention.
Figure 5:
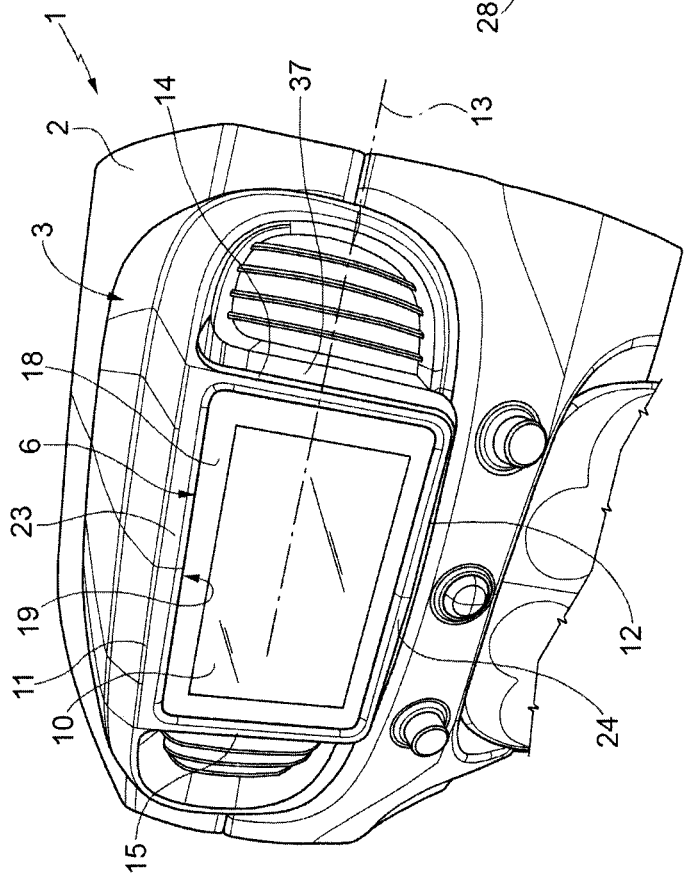

FIGS. 5 and 6 show a variant of the dashboard 1, the constituent parts are indicated using the same reference numerals used in FIGS. 1 and 2, where possible. In this case, the casing 6 is fixed with respect to structure 2. The casing 6 may be defined by a part different from the structure 2 and fixed to the latter, or defined by a part made in one piece with the structure 2.

At least part of the casing 6 projects with respect to the surface 3 so as to make the opening 16 accessible. As visible in FIG. 5, the dashboard 1 comprises a closing element 37, which is arranged at the opening 16 and is movable with respect to the structure 2 and the casing 6 to open/close the opening 16 in order to retain the device 9 in the pocket 7 and to improve the appearance. For example, the closing element 37 is defined by a removable cap, which is snap-coupled (in manner not shown) to the structure 2 and/or to the casing 6 at the side edge 14.

Figure 8:
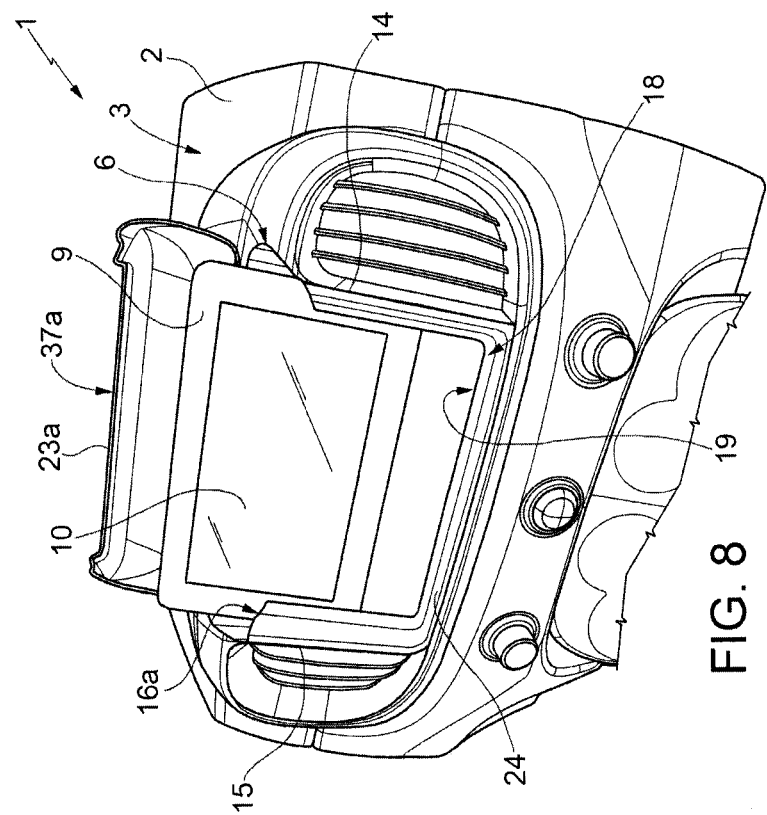
FIGS. 7 and 8 are similar to FIGS. 1 and 2, respectively, and show a second variant of the dashboard of the present invention.
Figure 7:
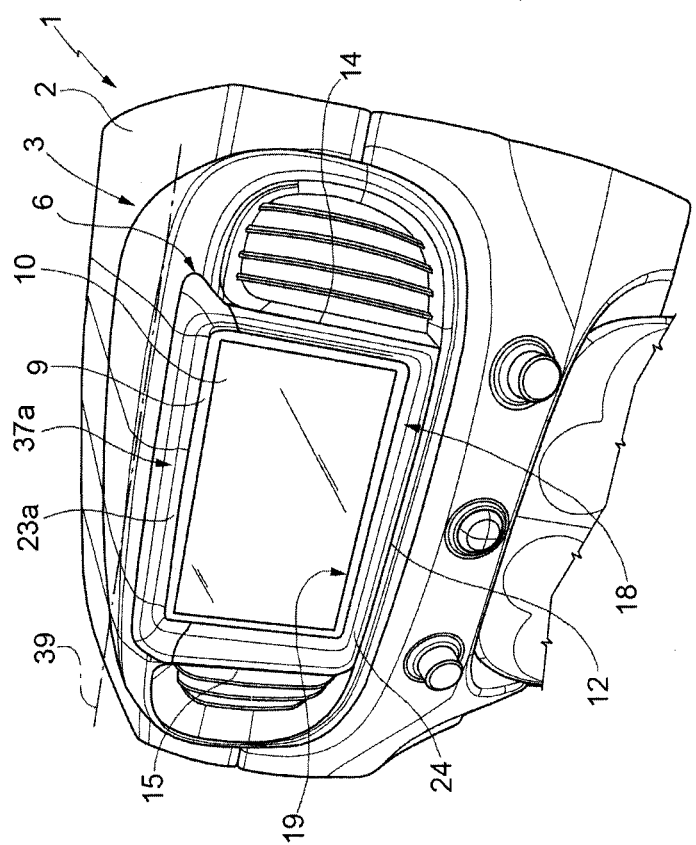

FIGS. 7 and 8 show another variant, which differs from the previous one because the casing 6 has an opening 16a made at the upper edge instead of the wall 21, for inserting/extracting the device 9. At the same time, the pocket 7 is closed at the side edge. At the same time, the connector 28 is supported by the casing 6 at the lower edge 12.

As shown in FIGS. 5 and 6, the casing 6 is fixed with respect to the structure 2. The dashboard 1 comprises a closing element defined by a door 37a, which is arranged at the opening 16a and is coupled either to the structure 2 or to the casing 6 or to the casing 6 so as to rotate about an axis 39 to open/close the opening 16a. In particular, the axis 39 is parallel to the axis 13. Advantageously, the frame 18 is free from the upper portion 23, and therefore it only defines three sides of the window 19. The fourth side is defined by a portion 23a belonging to the door 37a. A releasable locking device (not shown) is preferably provided to keep the door 37a closed.

Alternatively to the rotation about the axis 39, the door 37a could be sliding in horizontal direction to open/close the opening 16a.

According to a variant (not shown), the frame 18 only consists of two opposite bands arranged on opposite parts of the window 19, and therefore only defines two sides of the window 19.

From the above, it is apparent that the casing 6 is perfectly integrated in the dashboard 1 and allows to retain the device 9 stably in fixed position.

In particular, the solution in FIGS. 1 and 2 allows to avoid the making of additional parts for closing the opening 16,16a because the structure 2 of the dashboard 1 itself closes the pocket 7 when the casing 6 is arranged in its operative position.

At the same time, inserting and removing the device 9 is relatively simple. In particular, in the solution in FIGS. 1 and 2, the rotation of the casing 6 about the axis 25 allows to approach the opening 16 to the driver of the vehicle slightly, and thus makes inserting and removing the device 9 more comfortable.

Finally, from the above, it is apparent that changes and variations can be applied to the described dashboard 1 without departing from the scope of protection of the present invention.

For example, in addition to that described above, the dashboard 1 could have one or more adaptation masks to be able to house smaller portable electronic devices in the pocket 7 as well. In other words, the outer shape of each of said masks is complementary to the inner shape of the pocket 7, in order to be able to be inserted into and removed from the casing 6, and defines a compartment of appropriate size to house a smaller portable electronic device.

The invention claimed is:

1. A vehicle dashboard comprising a fixed structure and a casing for supporting a portable electronic device, said casing comprising:
   a pocket for housing said portable electronic device and having a substantially rectangular perimeter, defined by an upper edge, a lower edge and two side edges;
   a window for displaying a screen of said portable electronic device;
   a frame which frontally delimits said pocket and defines at least two sides of said window;
   an opening made at one of said edges to insert/remove said portable electronic device along a sliding direction; and
   guiding means for guiding said portable electronic device along said sliding direction in said pocket;
   said dashboard further comprising a closing portion different from said portable electronic device and adapted to close said opening;
   wherein said closing portion and said casing are movable with respect to each other to open/close said opening, wherein said casing is fixed with respect to said structure, and wherein said closing portion is defined by a movable closing element to open/close said opening.

2. The dashboard according to claim 1, wherein said closing portion is defined by a fixed portion of said structure, and said casing is movable with respect to said structure between an open position, wherein said opening is accessible, and an operating position, wherein said casing is housed in a cavity of said structure and said opening is closed by said fixed portion.

3. The dashboard according to claim 2, further comprising coupling means that connect said casing to said structure to allow said casing to rotate between said operating and opening positions about a rotation axis.

4. A vehicle dashboard comprising a fixed structure and a casing for supporting a portable electronic device, said casing comprising:
   a pocket for housing said portable electronic device and having a substantially rectangular perimeter, defined by an upper edge, a lower edge and two side edges;
   a window for displaying a screen of said portable electronic device;
   a frame which frontally delimits said pocket and defines at least two sides of said window;
   an opening made at one of said edges to insert/remove said portable electronic device along a sliding direction; and
   guiding means for guiding said portable electronic device along said sliding direction in said pocket;
   said dashboard further comprising a closing portion different from said portable electronic device and adapted to close said opening;
   wherein said closing portion and said casing are movable with respect to each other to open/close said opening,
   wherein said closing portion is defined by a fixed portion of said structure, and said casing is movable with respect to said structure between an open position, wherein said opening is accessible, and an operating position, wherein said casing is housed in a cavity of said structure and said opening is closed by said fixed portion;

wherein said dashboard further comprises coupling means that connect said casing to said structure to allow said casing to rotate between said operating and opening positions about a rotation axis; and wherein said rotation axis is substantially vertical.

5. The dashboard according to claim 4, wherein said casing is fixed with respect to said structure, and said closing portion is defined by a movable closing element to open/close said opening.

6. The dashboard according to claim 5, wherein one side of said window is defined by said closing element.

7. The dashboard according to claim 5, wherein said closing element is defined by a removable cap.

8. The dashboard according to claim 5, wherein said closing element is defined by a door rotating about a further rotation axis.

\* \* \* \* \*